Jan. 8, 1957  F. B. COKER ET AL  2,777,112
MAGNETOMETER SURVEY APPARATUS
Filed Nov. 12, 1953  2 Sheets-Sheet 1
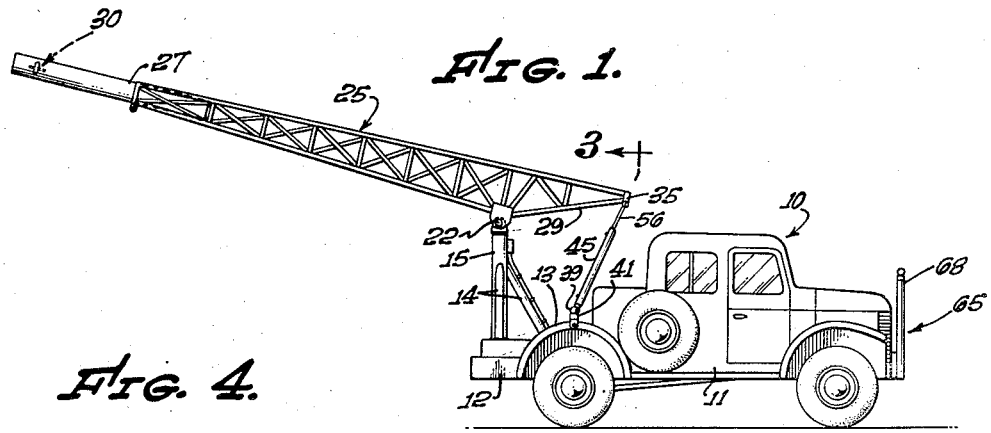
Fig. 1.
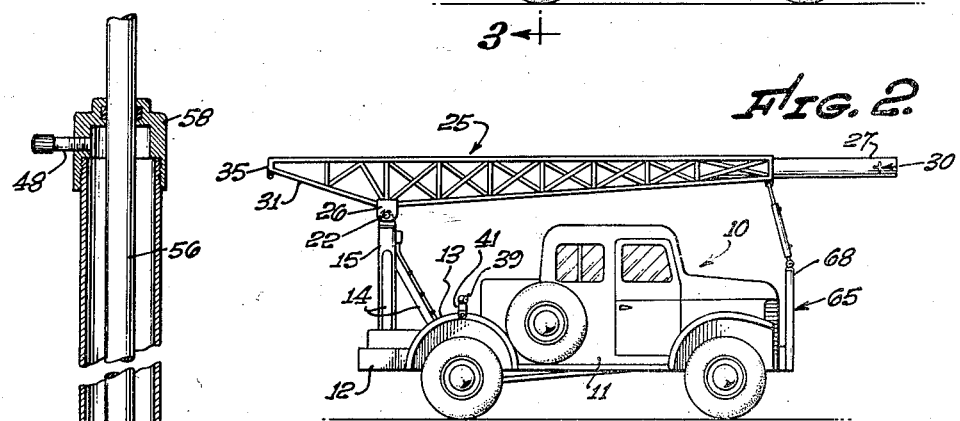
Fig. 4.
Fig. 2.
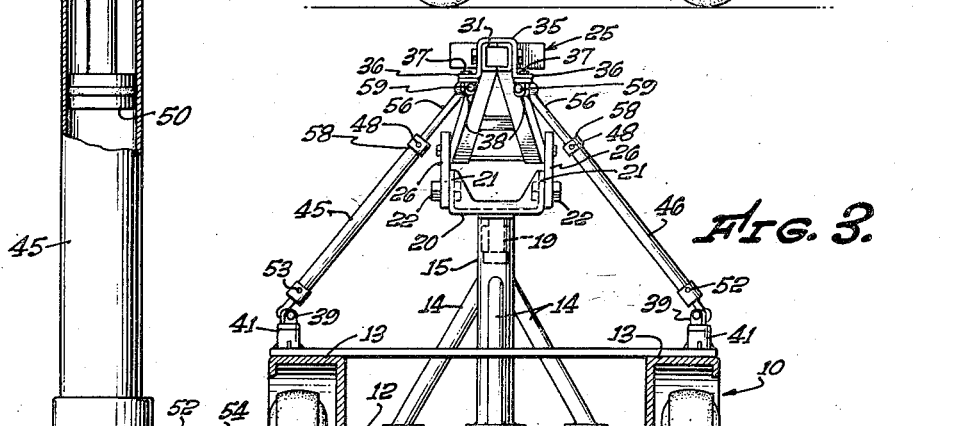
Fig. 3.
INVENTORS.
Frank B. Coker,
Otto W. Schoenberg,
BY
Reed & Lawlor
ATTORNEY.

Jan. 8, 1957
F. B. COKER ET AL
2,777,112
MAGNETOMETER SURVEY APPARATUS
Filed Nov. 12, 1953
2 Sheets-Sheet 2
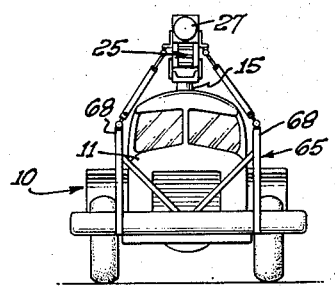
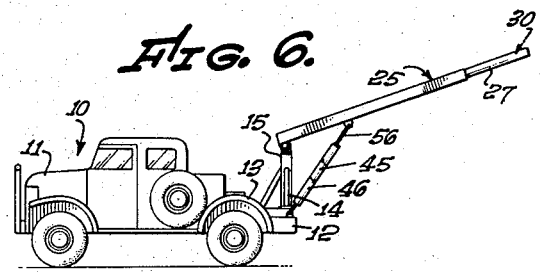
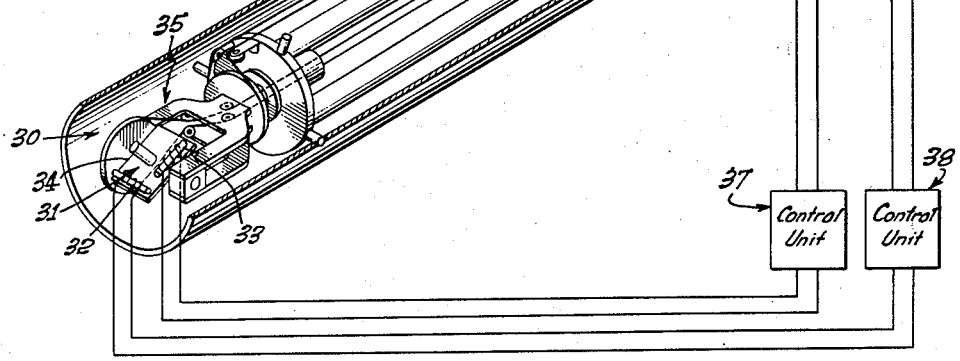
INVENTORS.
FRANK B. COKER,
OTTO W. SCHOENBERG,
BY
ATTORNEY.

United States Patent Office 2,777,112
Patented Jan. 8, 1957

2,777,112
MAGNETOMETER SURVEY APPARATUS

Frank B. Coker, Monterey Park, and Otto W. Schoenberg, Pasadena, Calif., assignors, by mesne assignments, to United Geophysical Corporation, Pasadena, Calif., a corporation of California Application November 12, 1953, Serial No. 391,421

15 Claims. (Cl. 324—8)

This invention relates to magnetometric surveying apparatus and more particularly to apparatus for use in supporting a magnetometer detector element on a ground vehicle where the detector element is to be maintained in some fixed orientation relative to the earth's magnetic field.

Magnetometers of various types have been employed to detect and measure variations in the strength of the earth's magnetic field as the magnetometer is moved over the earth. In one method of magnetometric surveying that has been employed in the past, magnetometers of the flux gate type have been used to detect and measure the small differences of interest in the strength of the earth's magnetic field. In the past such magnetometers have been carried by airplanes in order to rapidly survey the earth's magnetic field along the course of flight. When such surveys are made over land, the anomalies observed aid in locating formations that are likely to contain valuable mineral deposits such as oil or metallic ores. In one system that has been employed heretofore in making such surveys, the magnetometer detector element is maintained parallel with the earth's magnetic field during the flight though in other cases the element has been oriented in some other direction that bears a fixed angular relationship with the earth's magnetic field.

In order to make surveys that will reflect small local variations in the intensity of the earth's magnetic field as well as major variations that are noticeable only over large areas, it is desirable to make the measurements along a line close to the earth's surface. To make a survey at such a low elevation the airplane carrying the magnetometer is sometimes flown at a low altitude. This process, however, is very expensive and involves high risk to the instruments and to the operator especially in rugged terrain.

It is, therefore, an object of this invention to provide means for mounting a magnetometer on a ground vehicle, such as a motor truck, insuch a way that the desired orientation of the detector element may be maintained substantially constant while the vehicle is traveling over the terrain.

It is another object of the invention to provide an arrangement for mounting a sensitive magnetic field detector element on a ground vehicle in such a way that the danger of injury due to changes in movement of the vehicle as it travels over the terrain is minimized.

Another object of the invention is to provide mounting means for supporting a magnetometer on a ground vehicle in such a manner that the changes in movement of the vehicle are imparted gradually to the magnetometer detector element so that shock and vibration, due to travel of the vehicle over the terrain, is effectively cushioned and damped.

Another object of the invention is to provide means for mounting a magnetometer detector element as a position remote from the body of the vehicle that carries it.

Another object of the invention is to provide a mounting structure in which pistons and cylinders serve to support the weight of a boom on a vehicle, apply forces to the boom which tend to maintain it in a fixed position relative to the vehicle, and to effect a retarding and damping action which cushions torques applied to the boom and reduces mechanical oscillations thereof.

Another object of the invention is to provide manually operable adjusting means for varying the degree of damping action imparted by the cylinders to the boom.

Another object of the invention is to provide an arrangement for supporting a detector element on a boom carried by a vehicle at an elevated position remote from the vehicle and for retarding movement of the boom in response to torques applied by the vehicle to eliminate unnecessary projections from the vehicle when the detector element is not in use.

The foregoing and other objects of the invention will appear from the following description and from the drawings, which are intended for the purpose of illustration only, and in which:

Fig. 1 is a side elevational view of a motor truck equipped with a boom supporting a magnetometer at its distal end, the boom being shown in its extended, operative position;

Fig. 2 is a view similar to Fig. 1 but showing the boom retracted to an inoperative position and extending in overlying relation to the truck;

Fig. 3 is an enlarged cross-sectional view, taken on line 3—3 of Fig. 1;

Fig. 4 is a further enlarged side view of one of the control cylinders, the upper portion of the cylinder being shown in section;

Fig. 5 is a front view of the truck, showing a modified means for supporting the free end of the boom in its inoperative position;

Fig. 6 is a side elevational view of the truck, showing an alternative arrangement of the damping cylinders;

Fig. 7 is a partly broken away perspective view of the magnetometer and its supporting casing; and Fig. 8 is a perspective view of the detector element and orientation elements of the magnetometer.

In the embodiment of the invention shown in Figs. 1 to 3 inclusive a boom 25 supports a magnetometer unit 30 on a motor truck 10 having a body 11, a rear platform 12, and curved structural elements 13 providing the rear fenders of the truck. Projecting upwardly from the platform or bed 12 and braced by diagonal struts 14 is a post 15 for supporting the boom.

Rotatable in a boss at the upper end of the post 15 is a vertical, depending stud or spindle 19 of a U-shaped swivel element 20 having upstanding sides 21 carrying horizontal pivot studs 22.

The boom 25 is constructed in the form of a truss from structural sections of non-ferromagnetic metal, such as aluminum. Secured to the sides of the boom and projecting downwardly therefrom are fulcrum plates 26 having bearing holes for receiving the pivot studs 22. Thus the boom 25 is mounted for pivotal movement in a vertical plane and also for pivotal movement in a horizontal plane by reason of the pivot studs 22, rotary spindle 19 and associated parts, this arrangement thereby providing a universal joint for supporting the boom. The center of gravity of the boom 25 lies between the distal end of the boom and the post 15 thus being offset from the horizontal pivot axis passing through studs 22.

When the boom 25 is in its operative position, it normally extends rearwardly and upwardly from the truck in an inclined relation to both the truck bed 12 and the ground. The magnetometer 30, which is described in more detail hereinafter, is mounted within a cylindrical casing 27 at the outer free end of the boom. An extension 29 of the boom 25 is normally directed forwardly in overlying relation to the platform 12 of the truck. Suitably clamped to the end of the extension 29 is an inverted U-shaped member 35 having laterally projecting fingers 36 (see Fig. 3). Rotatable in holes in these fingers are vertical pivot studs 37 of swivel elements 38. Similar swivel elements 39 have their vertical studs 40 rotatable in bosses 41 carried by the structure 13 of the truck (see Fig. 4).

As shown in Fig. 4, control cylinders 45 and 46 have their lower ends connected by ball-and-socket connectors 47 to the swivel elements 39. Each cylinder has closed ends and a self-closing valve element 48 at its upper end through which air may be introduced into the upper end of the cylinder, that is, above pistons 50 that are slidable in the cylinders 45 and 46. At its lower end, each cylinder is provided with a fitting 52 having an orifice 53, the area of which may be varied by means of a valve screw 54.

The pistons 50 have rods 56 which extend upwardly through upper end caps 58 of the cylinders 45. The upper ends of the piston rods 56 have bearing holes pivotally connected to horizontal pivot studs 59 carried by the swivel elements 38.

With the boom 25 extending rearwardly from the truck, its distal end may be elevated by forcing air into the upper ends of the cylinders 45 and 46 and when the boom assumes a predetermined angle of inclination the introduction of air is discontinued.

As shown in Figs. 7 and 8, the magnetometer unit 30 may be of a type which includes a detector element 31 which is automatically maintained in alignment with the ambient magnetic field of the earth as the truck 10 travels over the terrain. In order to effect such an automatic alignment of the axis of the detector element with the earth's magnetic field two orientor elements, 32 and 33, are employed. The detector element 31 and the orientor elements 32 and 33 are rigidly mounted on a plate 34 which is supported on a gimbal structure 35 with the axes of the three elements mutually perpendicular. The orientor elements 32 and 33 are connected to corresponding control units 37 and 38 which operate corresponding servo-motors 39 and 40 to rotate the parts of the gimbal mechanism 35 automatically in such a way as to maintain the orientor elements perpendicular to the earth's magnetic field, thus aligning the detector element with the earth's field. It is not deemed necessary to describe in detail the apparatus for automatically maintaining the orientor elements perpendicular to the earth's magnetic field in detail and hence the axis of the detector element parallel to the earth's magnetic field, as many types of such apparatus are well known. One mechanism of this type is disclosed in Vacquier et al. Patent No. 2,555,207. Servo mechanisms of that type may be provided which have a time constant of approximately ¼ second so that the detector element is returned to substantial alignment with the earth's magnetic field in approximately one second if for any reason that alignment is disturbed.

As the truck travels over the terrain it is subjected to accelerations, due not only to a change in speed, but also due to changes in direction of travel, and also to changes in inclination of the terrain and to passing over holes, bumps and objects. Such accelerations tend to shock as well as rotate and twist the boom, thereby tending to deviate the magnetometer detector element from alignment with the earth's magnetic field. Furthermore, the boom 25 itself tends to oscillate about both vertical and horizontal axes, thereby tending to oscillate the detector element 31.

By the use of the present cushioning and vibration-damping arrangement, such as oscillatory movement and such deviations are minimized. For example, when the truck travels over rough terrain its rear end tends to oscillate or reciprocate both in a vertical plane and in a horizontal plane and to twist about a longitudinal axis. If the boom were rigidly attached to the truck, the outer end of the boom would move through an equal or greater distance and through about equal angles simultaneously with the corresponding truck movement and this would result in inaccuracies in the measurements of small differences in the strength of the earth's magnetic field and make it virtually impossible to detect small anomalies in rough terrain.

In the present mounting for the boom, the air trapped within the upper ends of the cylinders 45 and 46, being compressible, acts as a pair of springs to resiliently support the weight of the boom and also acts as a cushion for absorbing or attenuating dynamic forces that the truck would otherwise tend to impart to the outer instrument-supporting end of the boom.

Damping of relative movement between the boom and the truck is produced in part by the friction between the pistons and cylinders and partly by the ingress and egress of air through the orifices 53. The damping effect increases with the size of the orifices and may be varied by adjustment of the valve screws 54. In practice the moments of inertia of the boom and the stiffness of the piston-and-cylinder connectors are so selected that the time constant of the support system is longer than the time constant of the orienting system. Thus when the time constant of the servo mechanism is about ¼ second, the time constant of the support mechanism is about 2 or 3 seconds. Furthermore, for best results, the damping coefficient of the support system is about 90% of the "critical" value. In such a case, when the boom is displaced by a specific distance from its neutral position, then in returning to its neutral position it overshoots by about 10% of that distance. In such a case the time required for the detector element to become substantially aligned with the magnetic field is reduced to a minimum.

The mounting arrangement employed both cushions and attenuates torques applied to the boom about both its vertical and horizontal swivel axes. Thus as the vehicle turns in either direction or twists about its longitudinal axis, such movements impose lateral forces which tend to pivot the boom 25 in a horizontal plane about its vertical pivot 19. However, due to the angular arrangement of the cylinders 45 and 46, such pivotal movement about a vertical axis is resisted by the air trapped within the upper ends and damped by the air in the lower ends of the cylinders. As an example, if the turning motion of the truck is such that the boom extension 29 tends toward the right, as viewed in Fig. 3, then the piston 50 of the cylinder 45 is urged upwardly in this cylinder while the piston 50 of the other cylinder 46 is forced downwardly therein. The result of this action is to retard and attenuate the horizontal movement and oscillation of the boom and thus prevent excessive deviation of the detector element 31. Thus, the dual cylinder and piston means absorb both lateral and vertical shocks, and combinations of the same, to stabilize the boom and the magnetometer unit.

It is to be noted that the boom itself is mounted on a universal joint and the connections 37 and 59 together provide a universal joint and the swivel connections 38 and 39 and ball and socket connections 47 provide another universal joint so that both vertical and horizontal oscillations of the boom may occur and the pistons and the cylinders are able to follow the movements imparted to the boom. It is to be noted that as the pistons 50 move upwardly in the cylinders 45 and 46, they compress the air trapped at the upper ends to progressively increasing degrees thereby increasing the stiffness of the system so that an increasingly greater overload safety factor is provided against shocks of high amplitude as the free end of the boom moves downwardly.

When the use of the magnetometer 30 is discontinued, the boom 25 may be lowered by simply opening the valves 48 and 54 of the cylinders to allow the boom to tilt downwardly. By disconnecting the cylinders from the boom, which may be accomplished by removing the studs 59, the boom may be swung through 180 degrees to overlie the cab of the truck, as shown in Fig. 2. The free end of the boom may then rest upon a suitable support frame 65. With the boom thus retracted, maximum clearance is provided for driving the truck under trees and bridges and the like.

Referring now to Fig. 5, it is within the concept of this invention to utilize the cylinders 45 and 46 as the means for supporting the boom in its horizontal retracted position. After the boom has been lowered, the ends of the cylinders are disconnected from the swivel elements 39 and 38, after which the boom is swung to its retracted position. The upper and lower ends of the cylinders are then connected between the free end of the boom and the upper ends of stanchions 68 at the forward end of the truck as shown in Fig. 5. When so connected, the cylinders and their pistons serve as shock absorbers for the boom.

In the boom mount of Fig. 6, the boom 25 is connected to the post 15 for horizontal and vertical movement and is stabilized by air cylinders 45 and 46. In this embodiment, the cylinders and their piston rods are connected between the platform of the truck and the boom at a point intermediate the post and the free end of the boom which, in this case, has no rearward extension.

From the foregoing description and explanation, it is apparent that a mounting arrangement has been provided which facilitates maintaining the axis of a magnetometer detector element in a fixed orientation relative to the earth's magnetic field. When the vehicle carrying the element travels over the ground, the maintenance of such alignment is accomplished in part by the orienting system including the orientor elements, gimbal and servo-mechanisms that have been described above and partly by the resilient universal mounting of the orienting system on the ground vehicle. It will be noted that the orienting system, the universal mounting and the resilient damped connections all cooperate to cushion shocks and oscillations that would otherwise be imparted to the detector element. Moreover, since the time constant of the orienting system is shorter than the time constant of the resilient support by which the detector element is mounted on the vehicle, changes in orientation that would otherwise be imparted to the detector element because of changes in the velocity of the vehicle, are retarded sufficiently long to permit the orienting system to maintain the desired orientation.

While the invention has been described only with reference to detector elements that are aligned with the field to be measured, it is also applicable to systems in which the orientation is controlled in some other way.

While only a single embodiment of the invention has been described in which compressed air is employed to provide the desired resilience of the mount and the damping, it will be understood that such resilience and damping may be provided in other ways. For example, the piston and cylinder supports may be replaced by coil springs and the damping may be provided by dash-pot arrangements. It is therefore to be understood that various changes which will now suggest themselves to those skilled in the art may be made in the form, details of construction, and arrangement of the elements as well as changes in the material employed without departing from the principles of the invention. Reference is therefore made to the appended claims for a definition of the scope of the invention.

The invention claimed is:

1. In a mobile magnetic field measuring apparatus: a vehicle movable along the earth's surface, said vehicle being composed of magnetic material; a directionally-sensitive detector element responsive to a component of a magnetic field that is along an axis of said element; means including a boom composed of non-magnetic material for mounting said element at a point remote from said vehicle and for isolating said element magnetically from said vehicle, said mounting means including cushioning means interconnecting said detector element and said vehicle and permitting cushioned lateral and vertical movement of the element relative to said vehicle as said vehicle moves over the earth's surface; means for damping such cushioned movement; and means for maintaining a substantially fixed orientation of the axis of said detector element with respect to the direction of the earth's magnetic field while said mounting means moves relative to said vehicle as said vehicle moves over the earth's surface.

2. In a mobile magnetic field measuring apparatus: a vehicle movable along the earth's surface, said vehicle being composed of magnetic material; a directionally-sensitive detector element responsive to a component of a magnetic field that is along an axis of said element; means including a boom composed of non-magnetic material for mounting said element at a point remote from said vehicle and for isolating said element magnetically from said vehicle, said mounting means including cushioning means interconnecting said detector element and said vehicle and permitting cushioned lateral and vertical movement of the element relative to said vehicle as said vehicle moves over the earth's surface; means for damping such cushioned movement; means for maintaining a substantially fixed orientation of the axis of said detector element with respect to the direction of the earth's magnetic field while said mounting means moves relative to said vehicle as said vehicle moves over the earth's surface; and means controlled by said detector element for indicating the magnitude of said magnetic field component at various positions on the path traversed by said vehicle.

3. In a mobile magnetic field measuring apparatus: a vehicle movable along the earth's surface, said vehicle being composed of magnetic material; a boom carried by the vehicle and extending laterally therefrom, said boom being composed of non-magnetic material; a directionally-sensitive detector element mounted at a point on said boom remote from said vehicle and responsive to the magnitude of the component of a magnetic field along an axis of said element; means for reorienting the axis of said detector element automatically with respect to the earth's magnetic field when said axis deviates from a predetermined orientation relative to the earth's magnetic field so that said element responds to changes in the magnitude of such magnetic field component; means connecting the boom to said vehicle and cushioning lateral and vertical movement of the boom relative to said vehicle; and means for damping such lateral and vertical movement of the boom as the vehicle travels along the earth's surface.

4. In a mobile magnetic field measuring apparatus: a vehicle movable along the earth's surface, said vehicle being composed of magnetic material; a boom carried by the vehicle and extending laterally therefrom, said boom being composed of non-magnetic material; a directionally-sensitive detector element mounted at a point on said boom remote from said vehicle and responsive to the magnitude of the component of a magnetic field along an axis of said element; means for reorienting the axis of said detector element automatically with respect to the earth's magnetic field when said axis deviates from a predetermined orientation relative to the earth's magnetic field so that said element responds to changes in the magnitude of such magnetic field component; a universal mounting means connecting the boom to said vehicle and permitting lateral and vertical movement of the free end of the boom relative to said vehicle; resilient means connected between said vehicle and said boom for cushioning movement of the free end of said boom relative to said vehicle when said vehicle is subjected to acceleration; and means for damping such lateral and vertical movement of the boom as the vehicle travels along the earth's surface.

5. In a mobile magnetic field measuring apparatus: a vehicle movable along the earth's surface, said vehicle being composed of magnetic material; a boom carried by the vehicle and extending laterally therefrom, said boom being composed of non-magnetic material; a directionally-sensitive magnetic field detector element mounted on said boom at a point remote from said vehicle; means for reorienting the axis of said detector element automatically with respect to the earth's magnetic field when said axis deviates from a predetermined orientation relative to said field, so that said element responds to changes in the magnitude of said magnetic field; a universal mounting means connecting the boom to said vehicle adjacent the rear end thereof and permitting lateral and vertical movement of the free end of the boom relative to said vehicle; and pneumatic piston-and-cylinder damping means connected between the vehicle and said boom in a manner such that lateral and vertical movements of the free end of the boom relative to the vehicle are damped when said vehicle is subjected to acceleration.

6. In a mobile magnetic field measuring apparatus: a vehicle movable along the earth's surface, said vehicle being composed of magnetic material; a boom carried by the vehicle and extending laterally therefrom, said boom being composed of non-magnetic material; a directionally-sensitive magnetic field detector element mounted on said boom at a point remote from said vehicle; means for reorienting the axis of said detector element automatically with respect to the earth's magnetic field when said axis deviates from a predetermined orientation relative to said field, so that said element responds to changes in the magnitude of said magnetic field; a universal mounting means connecting the boom to said vehicle and permitting lateral and vertical movement of the free end of the boom relative to said vehicle; a pair of air cylinders having lower ends universally connected to spaced apart points of the vehicle, said cylinders diverging downwardly and laterally from the boom to their points of connection with the vehicle; and pistons slidable in said cylinders and having rods projecting from the upper ends of the cylinders and universally connected to the boom at a point spaced longitudinally from said universal mounting means.

7. In a mobile magnetic field measuring apparatus: a vehicle movable along the earth's surface, said vehicle being composed of magnetic material; a boom carried by the vehicle and extending rearwardly therefrom, said boom being composed of non-magnetic material; a directionally-sensitive magnetic field detector element mounted on said boom at a point remote from said vehicle; means for reorienting the axis of said detector element automatically with respect to the earth's magnetic field when said axis deviates from a predetermined orientation relative to said field, so that said element responds to changes in the magnitude of said magnetic field; a universal mounting means connecting the boom to said vehicle adjacent the center of the rear end thereof and permitting lateral and vertical movement of the free end of the boom relative to said vehicle; a pair of air cylinders having lower ends universally connected to opposite sides of the vehicle, said cylinders diverging downwardly and laterally from the boom to their points of connection with the vehicle; and pistons slidable in said cylinders and having rods projecting from the upper ends of the cylinders and universally connected to the boom at a point spaced longitudinally from said universal mounting means on the other side thereof from said free end.

8. In a mobile magnetic field measuring apparatus: a vehicle movable along the earth's surface, said vehicle being composed of magnetic material; a boom carried by the vehicle and extending laterally therefrom, said boom being composed of non-magnetic material; a directionally-sensitive magnetometer element mounted on said boom at a point remote from said vehicle; means for reorienting the axis of said magnetometer element automatically with respect to the earth's magnetic field when said axis deviates from a predetermined orientation relative to said field, so that said element responds to changes in the magnitude of said magnetic field; a universal mounting means connecting the boom to said vehicle and permitting lateral and vertical movement of the free end of the boom relative to said vehicle; a pair of air cylinders having lower ends universally connected to spaced apart points of the vehicle; and pistons slidable in said cylinders and having rods projecting from the upper ends of the cylinders and universally connected to the boom at a point spaced longitudinally from said universal mounting means on the other side thereof from said free end, said cylinders diverging downwardly and laterally from the boom to their points of connection with the vehicle, each of said cylinders having an air valve adjacent its upper end by which air can be introduced into said upper end and discharged therefrom.

9. In a mobile magnetic field measuring apparatus: a vehicle movable along the earth's surface, said vehicle being composed of magnetic material; a boom carried by the vehicle and extending laterally therefrom, said boom being composed of non-magnetic material; a directionally-sensitive magnetometer element mounted on said boom at a point remote from said vehicle; means for reorienting the axis of said magnetometer element automatically with respect to the earth's magnetic field when said axis deviates from a predetermined orientation relative to said field, so that said element responds to changes in the magnitude of said magnetic field; a universal mounting means connecting the boom to said vehicle and permitting lateral and vertical movement of the free end of the boom relative to said vehicle; a pair of air cylinders having lower ends universally connected to spaced apart points of the vehicle; and pistons slidable in said cylinders and having rods projecting from the upper ends of the cylinders and universally connected to the boom at a point spaced longitudinally from said universal mounting means on the other side thereof from said free end, said cylinders diverging downwardly and laterally from the boom to their points of connection with the vehicle, each of said cylinders having an air valve adjacent its upper end by which air can be introduced into said upper end and discharged therefrom, each cylinder also having variable orifice means at its lower end communicating between the interior of the cylinder and the atmosphere.

10. In a mobile magnetic field measuring apparatus: a vehicle movable along the earth's surface, said vehicle being composed of magnetic material; a boom carried by the vehicle, said boom being composed of non-magnetic material; a directionally-sensitive magnetometer element mounted on said boom at a point remote from said vehicle; means for reorienting the axis of said magnetometer element automatically with respect to the earth's magnetic field when said axis deviates from a predetermined orientation relative to said field, so that said element responds to changes in the magnitude of said magnetic field; a universal mounting means connecting the boom to said vehicle adjacent the rear end thereof and permitting lateral and vertical pivotal movement of the boom; resilient means connected between said vehicle and said boom for supporting said boom in a rearwardly extending direction from said vehicle and for cushioning movement of the free end of said boom relative to said vehicle when said vehicle is subjected to acceleration, said resilient means being disconnectible between the boom and the vehicle and said boom being rotatable to a substantially horizontal position in overlying relation to the vehicle with its free end located at the forward end of the vehicle; and support means at the forward end of the vehicle for supporting said free end.

11. In a mobile magnetic field measuring apparatus: a vehicle movable along the earth's surface, said vehicle being composed of magnetic material; a boom carried by the vehicle and extending laterally therefrom, said boom being composed of non-magnetic material; a directionally-sensitive magnetometer element mounted on said boom at a point remote from said vehicle; means for reorienting the axis of said magnetometer element automatically with respect to the earth's magnetic field when said axis deviates from a predetermined orientation relative to said field, so that said element responds to changes in the magnitude of said magnetic field; a universal mounting means connecting the boom to said vehicle adjacent the rear end thereof and permitting lateral and vertical movement of the free end of the boom relative to the vehicle; a pair of air cylinders having lower ends universally connected to sides of the vehicle; pistons slidable in said cylinders and having rods projecting from the upper ends of the cylinders and universally connected to the boom at a point spaced longitudinally from said universal mounting means, said cylinders diverging downwardly and laterally from the boom to their points of connection with the vehicle, each of said cylinders having an air valve adjacent its upper end by which air can be introduced into said upper end and discharged therefrom, each cylinder also having variable orifice means at its lower end communicating between the interior of the cylinder and the atmosphere, said pistons being disconnectible from the boom and said boom being rotatable to a substantially horizontal position in overlying relation to the vehicle with its free end located at the forward end of the vehicle; and support means at the forward end of the vehicle for supporting said free end.

12. In a mobile magnetic field measuring apparatus: a vehicle movable along the earth's surface; a directionally-sensitive field detector element responsive to a component of a vector field parallel to an axis of said element; support means for mounting said element in spaced relation to said vehicle and for isolating said element magnetically from said vehicle, said support means including cushioning means for permitting cushioned lateral and vertical movement of the element relative to said vehicle; means for damping such cushioned movement; and means for reorienting the axis of said detector element automatically with respect to the said vector field when said axis deviates from a predetermined orientation relative thereto, so that said element responds to changes in the magnitude of said vector field.

13. In a mobile magnetic field measuring apparatus: a vehicle movable along the earth's surface; a boom carried by the vehicle and extending laterally therefrom; a directionally-sensitive field detector element mounted on said boom at a point remote from said vehicle; said boom comprising non-magnetic material between said element and said vehicle thereby to isolate said element magnetically from said vehicle; means for reorienting the axis of said detector element automatically with respect to a reference direction when said axis deviates from a predetermined orientation relative thereto, so that said element responds to changes in a component of a magnetic field in said direction; means connecting the boom to said vehicle and cushioning lateral and vertical movement of the boom relative to said vehicle; and means for damping such lateral and vertical movement of the boom.

14. In a mobile field measuring apparatus: a vehicle movable along the earth's surface, said vehicle being composed of magnetic material; a boom carried by the vehicle and extending laterally therefrom, said boom being composed of non-magnetic material; a directionally-sensitive magnetic field detector element mounted on said boom; control means for reorienting the axis of said detector element automatically with respect to the earth's magnetic field when said axis deviates from a predetermined orientation relative to said field, so that said element responds to changes in the magnitude of said magnetic field; and shock absorbing means connected between said vehicle and said boom for cushioning and damping movement of the free end of said boom relative to said vehicle when said vehicle is subjected to acceleration, the time constant of said shock absorbing means being greater than the time constant of said control means.

15. A mobile magnetometer as defined in claim 14 wherein the damping coefficient of said shock absorbing means is about 90% of the critical value.

References Cited in the file of this patent

UNITED STATES PATENTS

| Number | Name | Date |
| --- | --- | --- |
| 832,171 | Sheddan | Oct. 2, 1906 |
| 1,383,094 | Fitzgerald | June 28, 1921 |
| 2,404,806 | Lindsey | July 30, 1946 |
| 2,472,944 | Furer et al. | June 14, 1949 |
| 2,502,108 | Taylor | Mar. 28, 1950 |
| 2,516,172 | Baldwin | July 25, 1950 |
| 2,544,548 | Wyeth | Mar. 6, 1951 |
| 2,611,802 | Jensen | Sept. 23, 1952 |

FOREIGN PATENTS

| Number | Country | Date |
| --- | --- | --- |
| 638,147 | Great Britain | May 31, 1950 |

OTHER REFERENCES

"The Airborne Magnetometer," by J. R. Balsey, Jr., in "Preliminary Report Geophysical Investigations," 1946, No. 134,097, by Department of Interior.